G. W. Tolhurst,
Washing Machine,
N° 28,021. Patented Apr. 24, 1860.
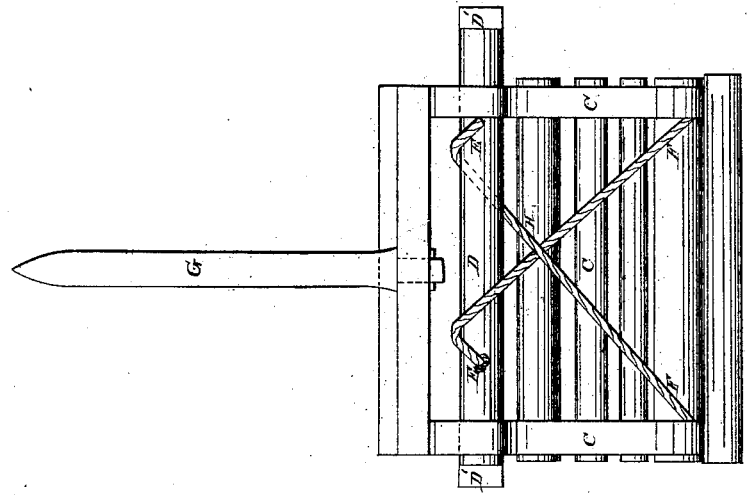
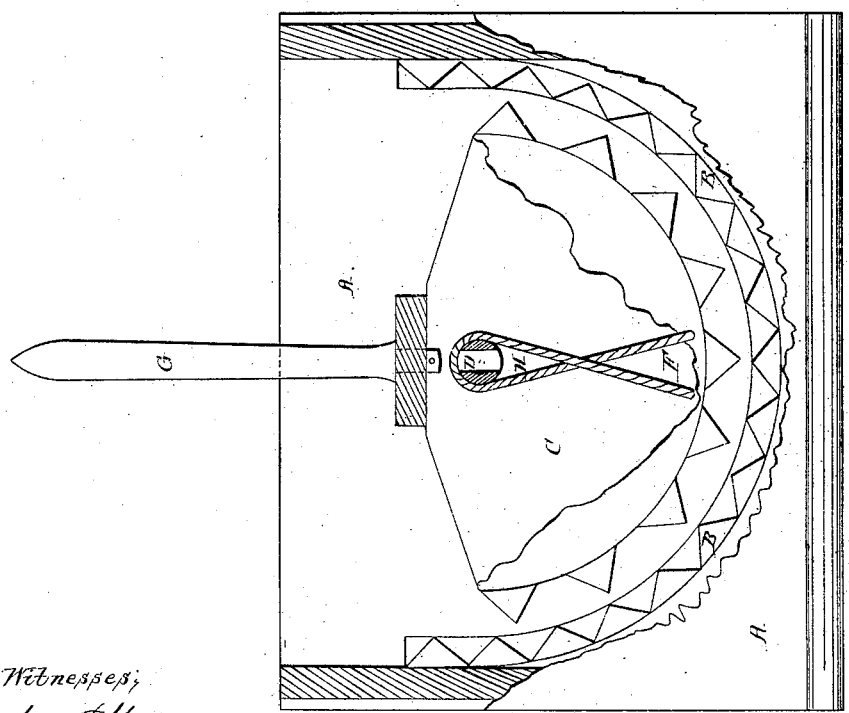

UNITED STATES PATENT OFFICE.

GEORGE W. TOLHURST, OF LIVERPOOL, OHIO.

WASHING-MACHINE.

Specification of Letters Patent No. 28,021, dated April 24, 1860.

*To all whom it may concern:*

Be it known that I, GEORGE W. TOLHURST, of Liverpool, county of Medina, and State of Ohio, have invented a new and useful Improvement in Machines for Washing Clothes; and I do hereby declare that the following is a full and exact description thereof, reference being had to the accompanying drawings and to the letters of reference marked thereon.

The nature of my invention consists in providing the shaft of a semicircular rubber with cords, straps, chains, or wires placed in a position (hereafter described) inside the rubber so as to cause a side motion when said rubber is made to oscillate.

To enable others skilled in the art to make and use my invention I will proceed to describe its construction and operation.

I construct my washing machine in any of the known box forms as shown at, A, Figure 1, the rubbing bottom of which is made of slats forming a semicircle, marked, B, Fig. 1. To correspond with said bottom I fit a rubber marked, C, C, Figs. 1, and 2. A full size rubber is made two inches narrower than the inside of the box it is to operate in. I then suspend said rubber loose on a shaft marked, D, D, Figs. 1, and 2. The ends of said shaft are made flat as shown at D', Fig. 2. These flat places fit into grooves cut into the inside of the box, A, for the purpose of keeping said rubber in place. Between the insides of said rubber I attach by any of the known means one end of each of two cords, straps, chains, or wires, (shown at H, H, Figs. 1, and 2,) to the shaft, D, Fig. 2. At a suitable distance from the end of said shaft as seen at E, E, Fig. 2, one of said cords is passed over on one side of said shaft and the other cord is passed over the other side of said shaft, and the other ends are brought down and secured to the lower end of said rubber near where it comes in contact with the clothes, as shown at Figs. 1 and 2 at F, F. Said cords when in this position cause the rubber to be pulled first on one side of the box and then on the other, as the rubber is oscillated by the handle, G, Figs. 1, and 2. The object of this side motion is to keep out folds that always draw in when a single motion is used for washing fine articles. The above described mode is far more durable, cheaper and causes less friction than any mode in use, this action being produced by the winding and unwinding of said cords on the shaft, D.

Having thus described my invention, what I claim as new and wish to secure by Letters Patent is—

The cords H, H, in combination with the shaft, D, and rubber, C, the whole being combined and arranged for the purposes herein set forth and specified.

GEORGE W. TOLHURST.

Witnesses:
GEO. TOLHURST,
THOMAS DAVIS.